United States Patent [19]

Ciaccio et al.

[11] 4,357,921

[45] Nov. 9, 1982

[54] PRESSURE REGULATOR FOR INJECTION SYSTEMS FOR SPARK IGNITION INTERNAL COMBUSTION ENGINES

[75] Inventors: Lorenzo Ciaccio; Alberto Banzola, both of Bologna, Italy

[73] Assignee: Weber Carburatori Azienda Della Weber S.p.A., Bologna, Italy

[21] Appl. No.: 272,609

[22] Filed: Jun. 11, 1981

[51] Int. Cl.³ .......................................... F02M 37/04
[52] U.S. Cl. .................................. 123/463; 123/459; 123/512; 137/510; 251/356
[58] Field of Search ............... 123/463, 459, 506, 512; 137/510; 251/356, 357, 88

[56] References Cited

U.S. PATENT DOCUMENTS

| | | | |
|---|---|---|---|
| 1,927,259 | 9/1933 | Dougherty | 251/88 |
| 3,005,625 | 10/1961 | Holley, Jr. | 123/463 |
| 4,231,347 | 11/1980 | Ohumi et al. | 123/512 |
| 4,284,039 | 8/1981 | Bellicardi et al. | 123/463 |
| 4,300,510 | 11/1981 | Ishida et al. | 123/463 |

FOREIGN PATENT DOCUMENTS 53-71726 6/1978 Japan ................................ 123/463

*Primary Examiner*—Ira S. Lazarus
*Assistant Examiner*—Magdalen Moy
*Attorney, Agent, or Firm*—Sughrue, Mion, Zinn, Macpeak & Seas

[57] ABSTRACT

A pressure regulator is provided for the fuel injection system of a spark ignition internal combustion engine. The regulator is designed to regulate the pressure at which fuel is delivered to the fuel injectors, this pressure being constantly referenced to a predetermined value for the purpose of maintaining the correct air/fuel mixture ratio for all conditions of use of the engine. In general terms, the regulator comprises an arrangement of various mechanical components which act to divide the flow of fuel delivered by a supply pump into two parts; one part of this flow is supplied to the injectors which take up the quantity required by the operating conditions of the engine, the remaining part being returned to the motor vehicle tank. To facilitate manufacture and assembly of the regulator, a particular form is given to the regulator valve element used to effect division of the fuel flow.

5 Claims, 2 Drawing Figures

PRESSURE REGULATOR FOR INJECTION SYSTEMS FOR SPARK IGNITION INTERNAL COMBUSTION ENGINES

BACKGROUND OF THE INVENTION

The invention relates to fuel pressure regulators, and in particular to a regulator of the same general form as that described in Italian Patent Application No. 3325 A/78 filed July 2, 1978. The characteristic feature of the regulator described in that Patent Application is the use of a valve element constituted by a hemisphere the centre of curvature of which is contained in the flat surface delimiting the hemisphere. This valve element is urged by resilient forces in such a way as to keep it in contact with the walls of a seating formed in a support which is rigidly connected to a diaphragm of the regulator; in this manner the displacements of the flat surface of the valve element are kept the same as the displacements of the support.

While the embodiments of the pressure regulator described in the aforesaid Application are both original and technically useful, it has been found that certain problems exist in relation to manufacture and assembly of the regulator on a large scale.

The object of the present invention is to overcome these problems with a valve element which, from the functional point of view, is substantially the same as that described in the aforesaid Patent Application, while, at the same time, is considerably easier to manufacture and assemble in mass production.

SUMMARY OF THE INVENTION

Accordingly, the present invention provides an improved pressure regulator for the fuel injection system of a spark-ignition internal combustion engine, said regulator comprising a casing, a diaphragm disposed within said casing and dividing the interior thereof into first and second chambers, first duct means connected to said casing and, in use, serving to place the said first chamber in communication with the induction manifold of the engine, second duct means connected to the casing and, in use, serving to place the said second chamber in communication with a fuel supply pump and with the fuel injectors of said engine, and third duct means connected to the casing and including a fuel return nozzle which extends into the interior of said second chamber whereby to enable said second chamber to be placed, in use of the regulator, in communication with the engine fuel tank, said nozzle being provided with a flat valve seat and regulating means arranged to cooperate with said valve seat provided on said nozzle to regulate the flow of fuel returning to the tank, the said regulation means comprising a valve element delimited by a spherical part and by a flat surface and so formed as to have an axis of symmetry, and a support rigidly connected to said diaphragm, said support being formed with a seating in which the said spherical part of the valve element is housed such as to enable the valve element to turn freely to maintain its flat surface facing the said flat valve seat of the nozzle whereby said flat surface and valve seat can cooperate to regulate fuel flow through said nozzle;

the improvement comprising forming the said valve element so as to define both a blind hole extending inwardly from the said flat surface and a cylindrical spigot extending outwardly from the side of the valve element opposite said flat surface, said hole and the said spigot having respective axes of symmetry which are coincident with one another and with the said axis of symmetry of the valve element, further providing said regulator with resilient means for urging the said spherical part of the valve element into contact with said seating, and arranging said flat surface such that it constitutes either a diametral plane of said spherical part or a plane parallel to said diametral plane and displaced slightly towards the said cylindrical spigot.

BRIEF DESCRIPTION OF THE DRAWINGS

A pressure regulator embodying the invention will now be particularly described, by way of example, with reference to the accompanying diagrammatic drawings, in which.

Figure 1:
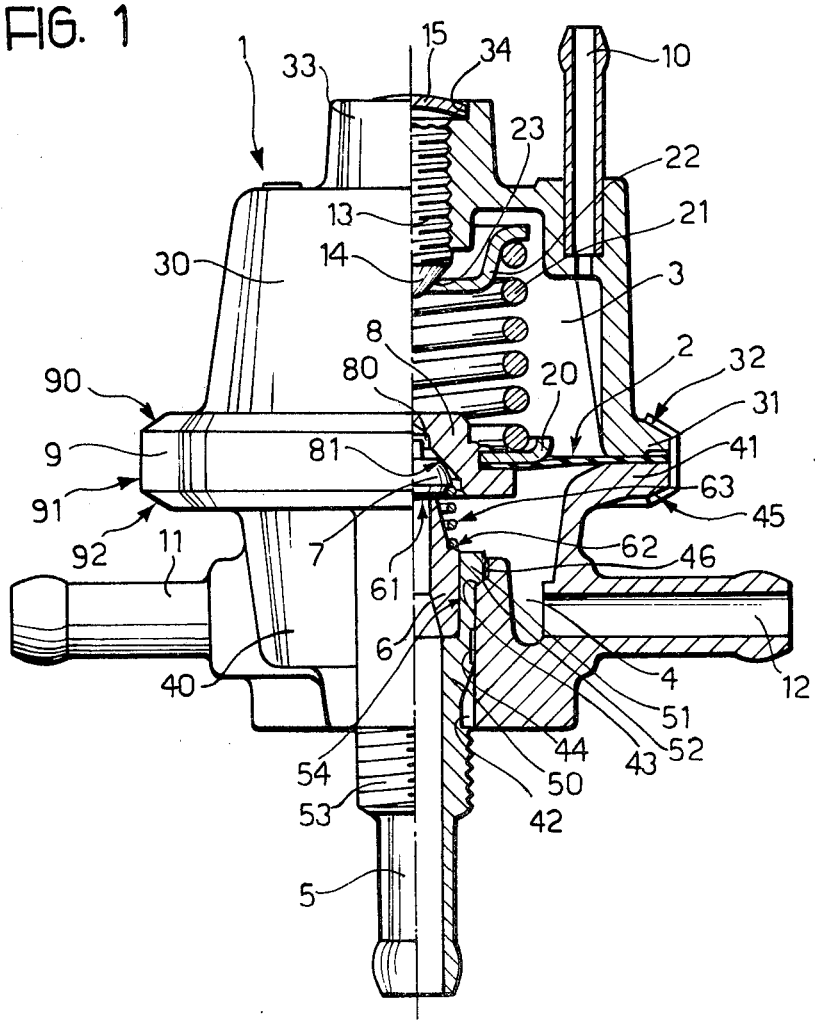
FIG. 1 is a side elevation of the regulator partially sectioned on a plane containing the axis of symmetry of the regulator.

The regulator illustrated in FIG. 1 is constituted by a metal housing which is composed of two casings 30 and 40 and is internally divided by a diaphragm 2 into two non-communicating chambers 3 and 4.

The chamber 3 is delimited by the casing 30 and the diaphragm 2 whereas the chamber 4 is delimited by the casing 40 and the diaphragm 2.

The edge portions 31 and 41 of the two casings 30 and 40 support the diaphragm 2 and are clamped together by means of a ring 9 which comprises a cylindrical wall 91 and two sides 90 and 92, these latter walls respectively overlying the frusto-conical parts 32 and 45 of the edge portions 31 and 41.

The chamber 3 is connected to the induction manifold, not shown, by means of a first duct, also not shown, connected to a tube 10; as a result, a reference pressure is established in the chamber 3 corresponding to the pressure in the induction manifold.

The chamber 4 is connected to the fuel supply pump by means of a second duct, now shown, which is connected to a tube 11; the chamber 4 is also connected to the injectors of the engine fuel injection system by means of a third duct, not illustrated, connected to a tube 12, and to the fuel tank of the motor vehicle by means of a fourth duct, not illustrated, connected to a connector tube 5.

If convenient or suitable the inlet tube connections 11 and 12 could be replaced by a single tube connection 11.

The connector tube 5 has a part 50 which is introduced into a through hole 44 formed in the lower part of the casing 40.

Above the through hole 44, and coaxial with it, there is disposed a locating recess 46 which has a polygonal plan form and which contains the hexagonal head 51 of the tube 5 and prevents it from turning.

A frusto-conical surface 43 joins the hole 44 with the locating recess 46: against this presses the surface 52, also frusto-conical, which forms part of the tube 5.

This coupling permits a good seal to be achieved against escape of fuel from the chamber 4, a seal which is improved by tightening a clamping nut disposed on a threaded part 53 of the tube 5.

The tube 5 also has a cylindrical locating recess 54 in which there is force fitted the body 6 of a sealing and regulation valve seat.

The flat sealing valve seat 61 and a flat surface 62, delimited by a circular ring, are the most important parts of the body 6.

The body 6, supported by the tube 5, constitutes the fuel return-flow nozzle which extends into the interior of the second chamber 4.

The flat valve seat 61 cooperates with the flat surface of a valve elememt 7; a spring 63 is disposed between the said annular surface 62 and a similar surface 73 formed in the valve element 7.

This spring 63 maintains a spherical part of the valve element 7 in contact with the conical surface 81 of a seating 80 formed in a support 8 which is rigidly connected to the diaphragm 2 by means of a washer 20.

The lower end of an adjustment spring 21 presses against the washer 20, the other end of this spring being supported by a spring-holder cap 22; this latter has a central hole 23 which houses the conical end 14 of a hexagonal socket grub screw 13 engaged in a threaded hole 32 which extends through a projection 33 on top of the casing 30.

Figure 2:
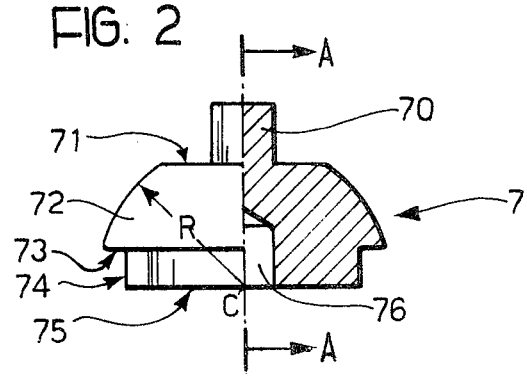
FIG. 2 is a side elevation of a valve element of the regulator, the valve element being shown partially sectioned.

By acting on the screw 13 a precompression of the spring 21 of determined value can be set. The threaded hole widens at the top to become a cylindrical housing 34 which contains a spring cap 15 preventing adjustment of the screw 13 by non-experts FIG. 2 illustrates, in particular, the valve element 7 disposed in the seating 80 of FIG. 1. The valve elememt is constituted by:

a part 72 having a spherical surface which comes into contact with the frusto-conical part 81 of the seating 80 in such a way as to constitute a ball and socket joint, a flat surface 75 which coooperates with the flat valve seat 61 to regulate the return flow of fuel to the engine fuel tank, a flat face 73 in the form of an annular shoulder on which presses the upper end of the spring 63, a cylindrical surface 74 which joins the surfaces 73 and 75 and on which is force fitted several turns of the spring 63 during a stage which precedes the assembly of the entire regulator;

a blind hole 76 formed perpendicularly to the flat surface 75;

a cylindrical spigot 70 which extends above the flat surface 71, disposed in the region of the element 7 opposite the surface 75.

The element 7 has an axis of symmetry A—A which coincides with the axis of symmetry of the hole 76 and the spigot 70. The centre C of the spherical part 72 is contained in the plane of the flat surface 75 or else in a plane displaced downwardly and parallel to this plane.

Although not directly relevant to the present discussion, we will briefly record here how a pressure regulator works, in order to explain how important it is to have the centre of rotation C of the valve element 7 in the plane of the surface 75.

During the operation of the engine it is necessary that the difference between the pressure existing in the duct which delivers fuel to the injectors, connected to the regulation chamber 4 by means of the connector tube 12, and the pressure existing in the induction manifold, where the injectors are located, should remain constant for all states of operation of the engine.

To achieve this the regulator varies the flow cross section defined between the surface 75 and the valve seat 61 of the nozzle 6. In maintaining the said pressure difference constant upon a hypothetical increase of the pressure in the manifold, the flat surface 75 approaches the nozzle 61 due to the thrust caused by the increase of the pressure which acts on the diaphragm 2 on the side facing the chamber 3 in which, as mentioned above, the pressure is the manifold pressure. The consequent reduction of the flow section towards the tank increases the pressure in the chamber 4 by an amount practically identical to the increase in the pressure which occurs in the chamber 3, maintaining constant the difference between the supply pressure to the injectors and the pressure in the induction manifold.

In a similar manner the regulator adapts the supply pressure to the injectors in response to a hypothetical reduction of the pressure in the manifold by increasing the distance between the surface 75 and the nozzle 61.

With respect to what is illustrated in the aforesaid Application 3325 A/78 the configuration described here, as well as being easy to manufacture, which will be discussed further below, also allows an increase in the self stabilising characteristics of the valve element 7, it now being possible to displace the centre of application of the resultant of the forces tending to close the valve element further below the sealing plane constituted by the surface 75, and the resultant of the opening forces, exerted by the spring 63, and applied to the circular ring of the element 7, further above the plane of the surface 75.

The invention particularly solves problems of production and assembly.

The valve element 7 can be produced by working with automatic machine tools starting from a cylindrical bar of suitable material.

The method for mass production of the element 7 can be one of several different methods; two such methods are indicated to explain the simplicity of manufacture.

The first method is constituted by the use of a forming tool on an automatic lathe. Such a tool is given a shape which generates the element 7, excluding the hole 76, when the bar rotates around the axis of revolution A—A.

The hole 76 is obtained using a piercing drill.

The second method is constituted by the use of a programmed lathe which is advanced step-wise to define the element 7 completely.

To better understand the function of the spigot 70, which physically defines the axis of symmetry of the workpiece 7, one must bear in mind the necessity of controlling the roughness of the surface 75 within close limits for correct operation of the regulator.

To obtain a surface having a very low roughness a lapping operation must be performed on the surface 75 after the element 7 has been made. This operation can be performed on a plurality of elements which can be contained on a single jig. This jig consists of a metal plate on which there is formed a plurality of holes each of which is suitable to house the spigot 70 of an element 7, maintaining its axis of symmetry perpendicular to the plane of the plate; consequently the surface 75 lies parallel to the plane of the plate and faces outwardly whilst the surface 71 comes into contact with the surface of the plate.

Having mounted the workpieces 7 on this plate by inserting their spigots 70 in the respective holes, a lapping tool is made to act on all the surfaces 75 which are located in a well defined plane and are rigidly positioned. By adopting the FIG. 2 form for the valve element 7 it is possible to assemble the regulator 1 by means of automatic machines. This is because the presence of the hole 76 allows the workpiece 7 to be supported during an assembly stage by means of suitable tools of an automatic machine. Such a tool maintains the workpieces coaxial with the casing 40, making it possible immediately to define the coaxiality of the casing 40 itself with the support element 8, the frusto-conical cavity 81 of which is supported by the spherical surface 72 of the element 7.

Consequently the correct positioning of the diaphragm 2 with respect to the edge portion 41 of the casing 40 is assured. The subsequent assembly and adjustment operations on the spring 21, and the assembly and clamping of the casing 30 by means of the ring 9 are then immediately achievable and particularly simple.

What is described is only one of the possible embodiments of the invention, which can have constructional variations which do not modify the essence of it. The forms, dimensions and materials used do not limit the scope of the present industrial monopoly.

We claim:

1. In a pressure regulator for the fuel injection system of a spark-ignition internal combustion engine, said regulator comprising:

a casing, a diaphragm disposed within said casing and dividing the interior thereof into first and second chambers, first duct means connected to said casing and, in use, serving to place the said first chamber in communication with the induction manifold of the engine, second duct means connected to the casing and, in use, serving to place the said second chamber in communication with a fuel supply pump and with the fuel injectors of said engine, third duct means connected to the casing and including a fuel return nozzle which extends into the interior of said second chamber whereby to enable said second chamber to be placed, in use of the regulator, in communication with the engine fuel tank, said nozzle being provided with a flat valve seat, and regulating means arranged to cooperate with said valve seat provided on said nozzle to regulate the flow of fuel returning to the tank, the said regulation means comprising a valve element delimited by a spherical part and by a flat surface and so formed as to have an axis of symmetry, and a support rigidly connected to said diaphragm, said support being formed with a seating in which the said spherical part of the valve element is housed such as to enable the valve element to turn freely to maintain its flat surface facing the said flat valve seat of the nozzle whereby said flat surface and valve seat can cooperate to regulate fuel flow through said nozzle;

the improvement wherein:

the said valve element is so formed as to define both a blind hole extending inwardly from the said flat surface and a cylindrical spigot extending outwardly from the side of the valve element opposite said flat surface, said hole and the said spigot having respective axes of symmetry which are coincident with one another and with the said axis of symmetry of the valve element, said regulator is further provided with resilient means for urging the said spherical part of the valve element into contact with said seating, and said flat surface constitutes either a diametral plane of said spherical part or a plane parallel to said diametral plane and displaced slightly towards the said cylindrical spigot.

2. A pressure regulator according to claim 1, wherein said resilient means is constituted by a spring and said valve element has a cylindrical part and a flat annular face, the said cylindrical part serving to support several turns of said spring the upper end of which presses against said annular face, and the base of the said cylindrical part having one end face thereof constituted by the said flat surface of the valve element.

3. A pressure regulator according to claim 2, wherein said annular face on which the said spring presses, serves to delimit the said spherical part of the element, said annular face lying in a plane parallel to said flat surface and being displaced towards the spigot with respect to the said diametral plane.

4. A pressure regulator according to claim 3, wherein said nozzle is provided with a flat annular surface which serves to support said spring at its end remote from the valve element.

5. A pressure regulator according to claim 1, wherein the said valve element has a second flat surface which is parallel to the first-mentioned flat surface, the said cylindrical spigot extending out from the said second flat surface.

* * * * *